No. 782,216. PATENTED FEB. 14, 1905.
J. G. CAIN.
BRIDLE BIT.
APPLICATION FILED MAR. 22, 1904.
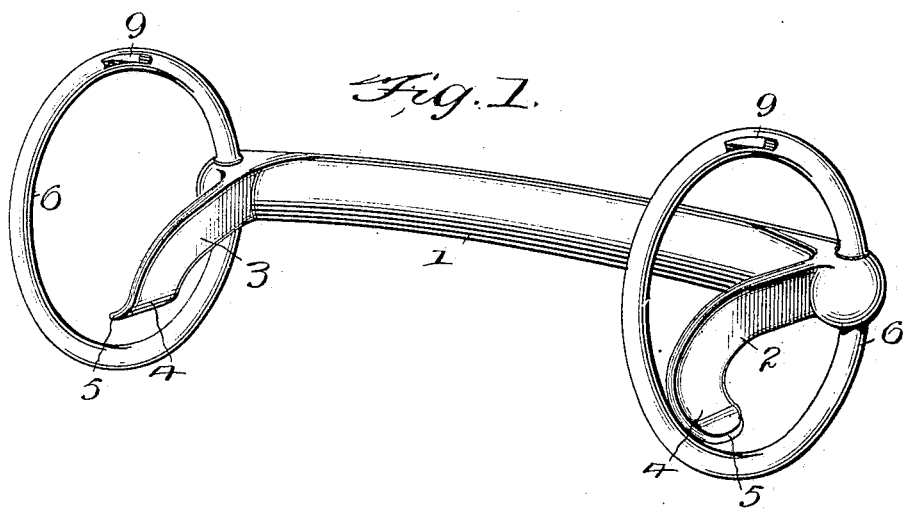
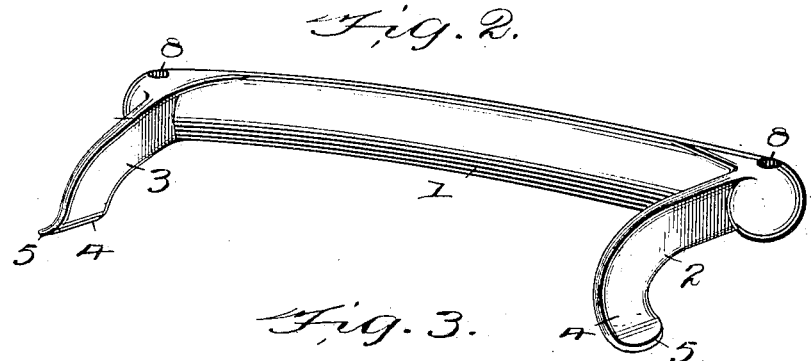
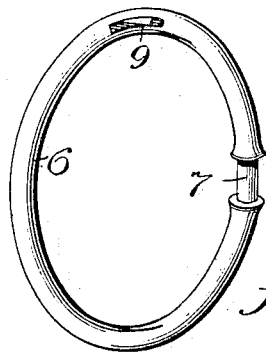
Witnesses
F. Barry.
J. C. Beetham.
Inventor
James G. Cain.
By W. T. Fitzgerald
Attorneys No. 782,216. Patented February 14, 1905.

UNITED STATES PATENT OFFICE.

JAMES GRANBURY CAIN, OF MEMPHIS, TENNESSEE.

BRIDLE-BIT.

SPECIFICATION forming part of Letters Patent No. 782,216, dated February 14, 1905.

Application filed March 22, 1904. Serial No. 199,355.

*To all whom it may concern:*

Be it known that I, JAMES GRANBURY CAIN, a citizen of the United States, residing at Memphis, in the county of Shelby and State of Tennessee, have invented certain new and useful Improvements in Bridle-Bits; and I do hereby declare the following to be a full, clear, and exact description of the invention, such as will enable others skilled in the art to which it appertains to make and use the same.

My invention relates to bridle-bits; and it consists of certain novel features of combination and construction of parts, the preferred form whereof will be hereinafter clearly set forth, and pointed out in the claims.

The prime object of my invention, among others, is to provide a bridle-bit which will insure that the mouth-bar or bit proper cannot be drawn laterally through the mouth of the animal, and thus disposed out of its efficient operative position.

A further object of my invention is to provide suitable extensions upon each end of the mouth-bar or bit proper which will be preferably integrally formed with said bit and absolutely rigid or having no relative movement to the bit.

Other objects and advantages will be hereinafter made clearly apparent, reference being had to the accompanying drawings, which are made a part of this application, and in which—

Figure 1 shows a perspective view of my improved bit complete and ready for use. Fig. 2 is a perspective view showing the mouth-bar or bit proper with the side rings adapted to coöperate with the reins and headstall of the bridle removed. Fig. 3 shows a perspective view of one of the rings designed to coöperate with the mouth-bar and to which may be connected in the usual manner the driving-reins and the headstall or cheek-straps of the bridle.

For convenience of description of the various parts of my invention and coöperating accessories numerals will be employed, the same numeral applying to a similar part throughout the several views, and, referring to the numerals on the drawings, 1 designates the mouth-bar or bit proper, which is formed of any preferred material and any desired size and may be straight or slightly curved, as deemed most suitable, and upon each end of the mouth-bar I provide the rearwardly-projecting extensions or controlling-bars 2 and 3, each of which may be made any desired length and shape in cross-section, though I prefer that they shall be projected backward, curving slightly toward the center of the mouth-bar until they gently turn downward and then outward, forming the curved portion 4 and the outwardly-directed terminal or lip-section 5, whereby said controlling-bars will prevent the bit from being drawn laterally through the mouth, thereby insuring that the animal will be placed under perfect control of the driver or rider, and at the same time prevent the mouth of the animal from being injured. I also provide suitable side rings 6, which are preferably formed with a reduced portion 7, designed to fit within the normally vertically disposed aperture 8 in each end of the mouth-bar or bit proper.

In the upper part of the ring I form a suitable slot 9, designed to receive the lower end of the cheek-strap of the bridle, (not shown,) the rings 6 being preferably of proper size to prevent interference with the ends of the controlling-bars 2 and 3 or the terminal sections 5 thereof. It will thus be seen that I have provided a reliably efficient form of controlling-bit, which by reason of the controlling-bars or rearward extensions 2 and 3 cannot be casually drawn out from one side of the animal's mouth even though the horse should move his head to one side, whereby the rein would thus draw longitudinally upon the bit, it being obvious that the controlling-bar would engage transversely with the lower jaw, and thus be held against further longitudinal movement.

It is well known that a horse will at times in a fit of stubborness hold his head to one side, and it is therefore obvious that the driver may force the animal to bring his head into a proper position by means of one of the controlling-bars 2 or 3 engaging with the lower jaw of the animal, thus causing the force of the pull upon the rein to be applied to moving the animal's head into proper position.

It will be understood that while the rearward extensions or bars 2 and 3 are thus designed for engagement with the mouth, and especially with the lower jaw of the animal, said extensions should be finished with a slightly-rounded surface, so that there will be no corners or angular parts to engage with and injure the animal.

It is thought that the foregoing description considered in connection with the accompanying drawings will clearly disclose the construction and salient features of my invention, and believing that the advantages and manner of using my improved bit have thus been made clearly apparent further description is deemed unnecessary.

While I have described the preferred combination and construction of parts deemed necessary in materializing my invention, I desire to comprehend in this application all substantial equivalents and substitutes as may be considered as falling fairly within the scope of my invention.

What I claim as new, and desire to secure by Letters Patent, is—

1. The herein-described bit, comprising the bit proper or mouth-bar 1 formed of one continuous piece of metal, fingers or controlling-bars 2 and 3 near each end of said mouth-bar corresponding in width throughout their entire length to the thickness of the mouth-bar and formed integral therewith, said controlling-bars being oblong in cross-section and extending rearwardly therefrom, the outer or free ends of said controlling-bars being curved downwardly and thence outwardly whereby said controlling-bars may be drawn laterally into engagement with the jaw of the animal without injury thereto, the bars 2 and 3 preventing the withdrawal of the bit from the mouth of the animal, rings carried in suitable openings at each end of the mouth-bar and having a swinging movement relative thereto, said rings being of sufficient diameter to swing freely over said controlling-bars and provided with slotted openings for coöperation with the cheek-straps of the bridle, substantially as specified and for the purpose set forth.

2. A bit comprising a rigid body or bar 1, rigid rearwardly-extending projections 2 and 3 near each end of said body of a width corresponding to the thickness of the bar 1, said projections being flattened and having their broad sides directed laterally, said projections 2 and 3 also having their rear ends curved downwardly and outwardly whereby the terminals will be disposed obliquely, relative to the remaining portion of the projections, the extreme ends of the body being extended beyond said projections and having vertically-disposed apertures, a ring in each of said apertures of a size to extend over said extensions, all substantially as specified and for the purpose set forth.

In testimony whereof I have signed my name to this specification in the presence of two subscribing witnesses.

JAMES GRANBURY CAIN.

Witnesses:
R. G. BELCHER,
JOS. LIEMAIR.